(12) United States Patent
Barsoum et al.

(10) Patent No.: US 7,515,640 B1
(45) Date of Patent: Apr. 7, 2009

(54) SYSTEMS AND METHODS FOR COMMUNICATING IN A DISCRETE MULTITONE SYSTEM

(75) Inventors: Maged F. Barsoum, Sunnyvale, CA (US); Fred Berkowitz, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1235 days.

(21) Appl. No.: 10/633,498

(22) Filed: Aug. 5, 2003

(51) Int. Cl.
*H04K 1/10* (2006.01)
(52) U.S. Cl. .................................... 375/260; 370/525
(58) Field of Classification Search ......... 375/260–270; 359/279; 370/525–526; 714/801
See application file for complete search history.

(56) References Cited

U.S. PATENT DOCUMENTS

| | | | | |
|---|---|---|---|---|
| 6,512,797 B1 * | 1/2003 | Tellado et al. | ............... | 375/261 |
| 6,621,617 B1 * | 9/2003 | Poggiolini | ................... | 359/279 |
| 2003/0026346 A1 * | 2/2003 | Matsumoto et al. | ......... | 375/262 |
| 2004/0148560 A1 * | 7/2004 | Hocevar | ..................... | 714/801 |

* cited by examiner

*Primary Examiner*—Curtis Kuntz
*Assistant Examiner*—Maria El-Zoobi
(74) *Attorney, Agent, or Firm*—Harrity & Harrity, LLP

(57) ABSTRACT

A system for communicating in a discrete multitone system includes a transmitting station and a receiving station. The transmitting station transmits redundant sets of data on each of a number of different tones. The receiving station receives the redundant sets of data and identifies the data represented by the redundant sets of data using a voting scheme, such as a majority voting scheme.

15 Claims, 5 Drawing Sheets

100

US 7,515,640 B1

SYSTEMS AND METHODS FOR COMMUNICATING IN A DISCRETE MULTITONE SYSTEM

TECHNICAL FIELD

The present invention relates generally to network communications and, more particularly, to communicating in a discrete multitone system.

BACKGROUND ART

In many transmission systems, transmitting and receiving devices interact to establish parameters associated with communicating between themselves. For example, in a discrete multitone (DMT) system, the transmitting and receiving devices exchange information to establish communications parameters during a period referred to as a training period. The training period typically includes a handshaking process in which the devices learn about each others capabilities, indicate the protocol to be used for transmission between the two devices, identify the number of carriers or tones to be used to carry data, etc.

After the handshaking, the devices perform a channel analysis to identify the condition of the channel over which data will be transmitted. The devices may also perform timing analysis/timing recovery to synchronize the transmitter and receiver, adjust receiver gain and perform other steps to ensure that the two devices are able to communicate.

One problem associated with the training period is that the data transmitted between the two devices may be subject to noise, intersymbol interference (ISI) and intercarrier interference (ICI). In addition, various channel qualities are also unknown during training, such as the channel frequency response. As a result, a receiving device may be unable to correctly decode a transmission associated with setting up the parameters for communicating with a transmitting device. This may lead to a training failure and result in the two devices being unable to establish communications with each other.

DISCLOSURE OF THE INVENTION

There exists a need for systems and methods for transmitting data in a reliable manner that minimizes the effects of noise and other disturbances.

These and other needs are met by the present invention, where a number of data bits are transmitted on a number of tones in a redundant manner. A receiver identifies the data transmitted on the number of tones using a voting scheme.

According to one aspect of the invention, a method for transmitting data between a first device and a second device is provided in a DMT system. The method includes allocating a predetermined number of bits of data for each tone and transmitting redundant sets of data on each of a number of different tones, where each redundant set includes the predetermined number of bits of data. The method also includes receiving the redundant sets of data by the second device and identifying the data represented by the redundant sets of data using a voting scheme.

Another aspect of the present invention provides a first device configured to communicate using DMT modulation. The first device includes logic configured to allocate a first number of bits of data for each of a number of tones and logic configured to receive a redundant set of data via a plurality of tones from a second device. The first device also includes logic configured to identify the data based on a voting scheme.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

BEST MODE FOR CARRYING OUT THE INVENTION

Figure 1:
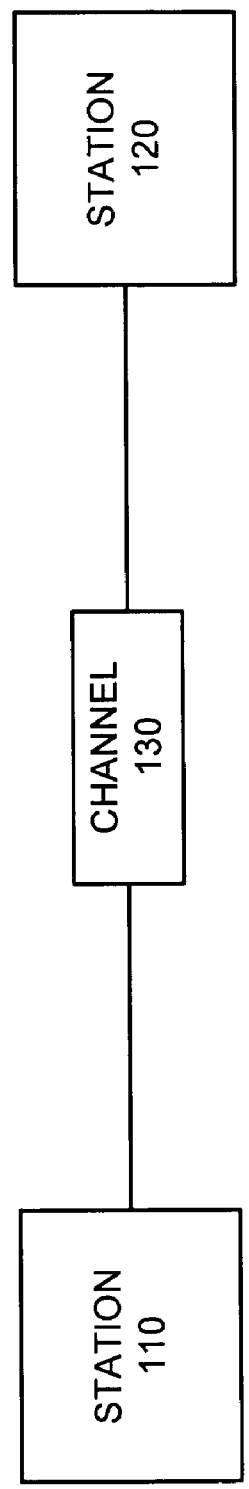
FIG. 1 is a block diagram of an exemplary network in which methods and systems consistent with the present invention may be implemented.

FIG. 1 is a block diagram of an exemplary network 100 in which systems and methods consistent with the present invention may be implemented. The exemplary network 100 includes stations 110 and 120 connected via transmission channel 130. Stations 110 and 120 may include one or more devices capable of transmitting and/or receiving data via channel 130. In one implementation, stations 110 and 120 transmit and receive data over channel 130 using DMT modulation techniques.

Channel 130 may include a wired or wireless transmission channel. For example, channel 130 may include conventional telephone wiring, e.g., twisted pair copper wire. Alternatively, channel 130 may include coaxial cable, a radio frequency (RF) link or some other medium that permits data to be transmitted between stations 110 and 120.

The number of components illustrated in FIG. 1 is provided for simplicity. A typical network may include more stations and/or transmission channels than illustrated in FIG. 1. In addition, channel 130 may connect to other networks, such as the public switched telephone network (PSTN) (not shown).

Figure 2:
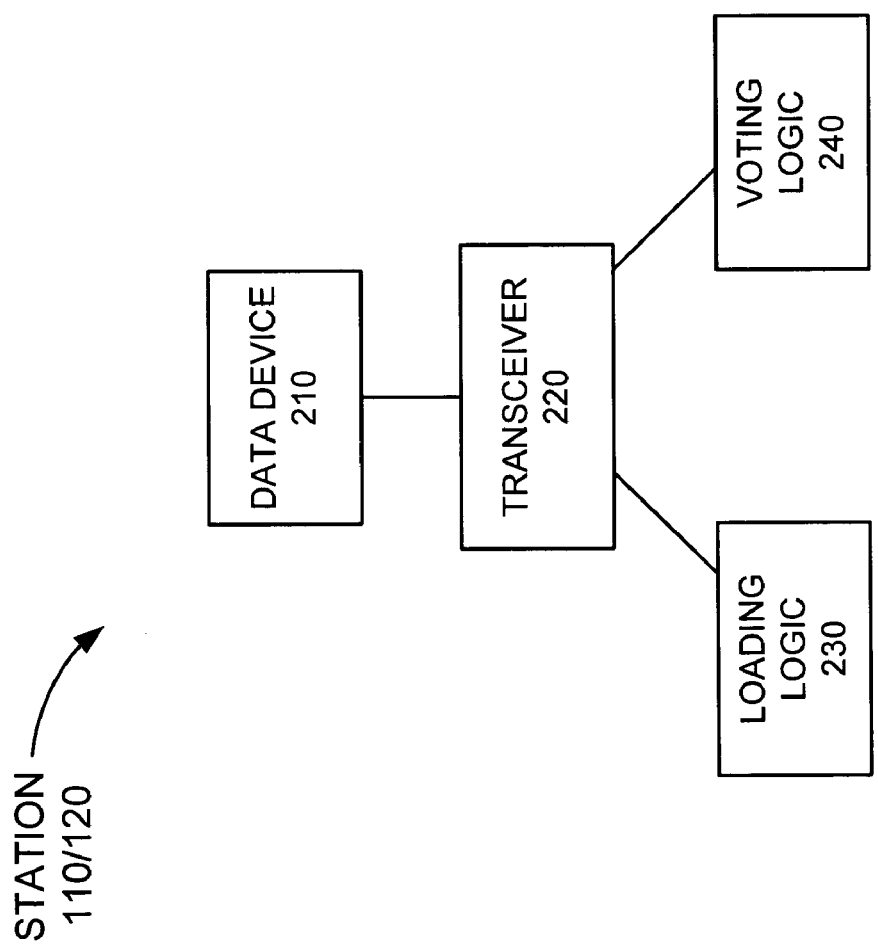
FIG. 2 is a block diagram of an exemplary configuration of a station of FIG. 1 consistent with the present invention.

FIG. 2 illustrates an exemplary configuration of station 110 of FIG. 1 in an implementation consistent with the present invention. It will be appreciated that station 120 may be similarly configured. Station 110/120 may include a data device 210, a transceiver 220, loading logic 230 and voting logic 240. It should be understood that station 110/120 may include other components (not shown) that aid in the reception, transmission and processing of data.

Data device 210 may include some type of computing device, such as a personal computer, laptop, personal digital assistant (PDA) or some other intelligent processing device. Data device 210 may also include a media access controller (MAC) that transmits and receives data packets to/from transceiver 220.

Transceiver 220 may include one or more physical layer transceivers that transmit and receive data via channel 130. In accordance with an exemplary embodiment of the present invention, stations 110 and 120 communicate using DMT modulation techniques. Accordingly, transceiver 220, consistent with the present invention, may include a transmitter portion that receives a digital data stream from data device 210 and converts the data into a series of tones. In a DMT system, 256 carriers (also referred to as tones) may be used to carry data, with each tone being separated by 4.3125 KHz. Alternatively, other numbers of tones may be used to carry the data and other separations between tones may be used. Each tone may also carry 15 bits. Alternatively, each tone may be used to carry more or less bits of data, based on the particular system requirements. Transceiver 220 may also include a receiver portion that receives data transmitted in accordance with a DMT protocol and converts received tones into a serial bit stream, as described in more detail below.

Loading logic 230 may determine the number of bits that may be loaded in each tone when transmitting data between stations 110 and 120. In accordance with an exemplary implementation of the present invention, loading logic 230 may determine that a predetermined number of bits are to be loaded on each of several tones in a redundant manner. This may provide an extremely reliable transmission mode that is effectively immune from noise problems, as described in more detail below.

Figure 3:
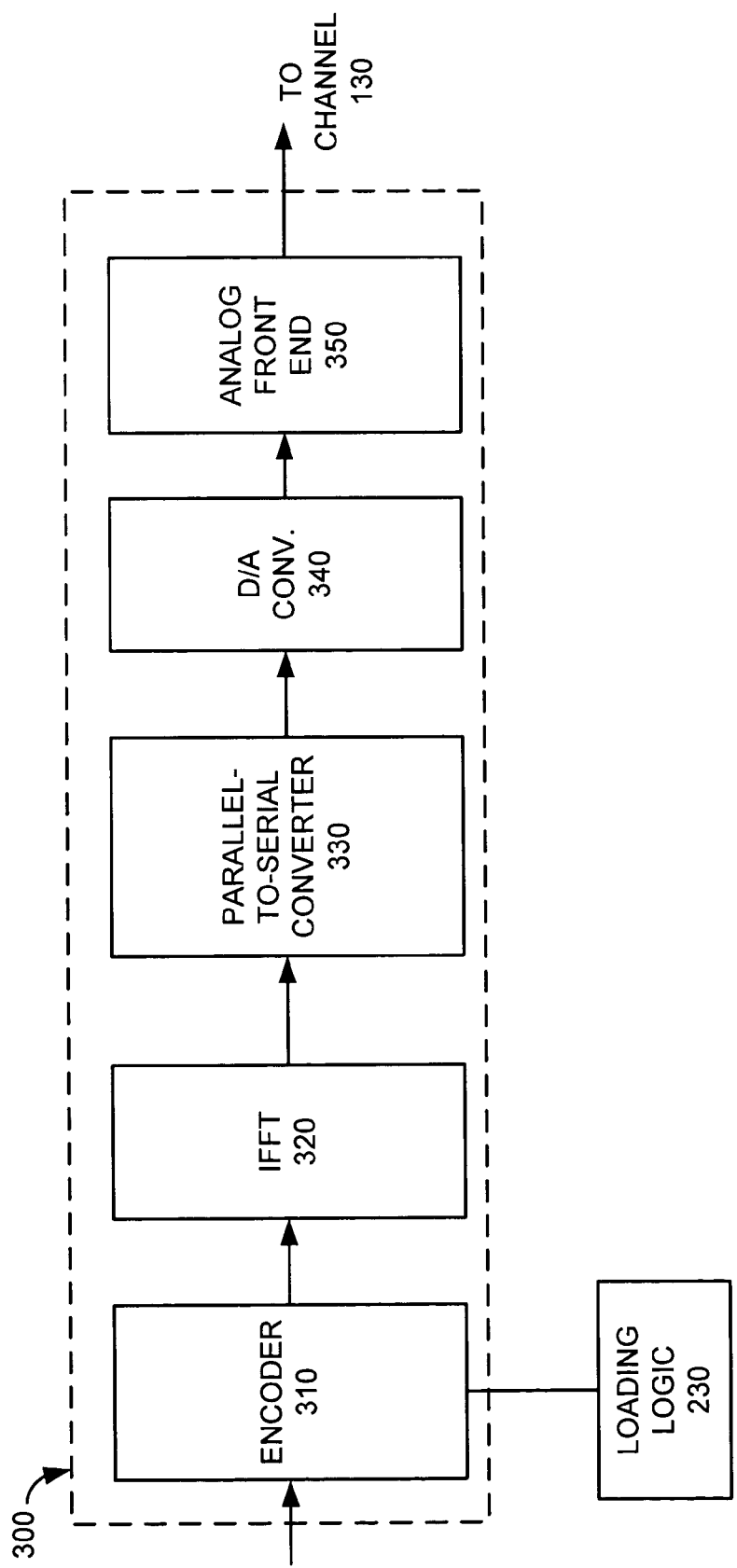
FIG. 3 is an exemplary detailed block diagram of a transmitter portion of the transceiver of FIG. 2, consistent with an implementation of the present invention.

As discussed above, transceiver 220 may include a transmitter portion and a receiver portion. FIG. 3 is an exemplary detailed diagram of the transmitter portion 300 of transceiver 220 (referred to as transmitter 300) according to an implementation consistent with the present invention. Transmitter 300 may include an encoder 310, Inverse Fast Fourier Transform (IFFT) logic 320, a parallel-to-serial converter 330, a digital-to-analog (D/A) converter 340 and an analog front end (AFE) 350.

Encoder 310 receives a stream of data bits from data device 210 and may organize the bits into groups based on information received from loading logic 230, as described in more detail below. Encoder 310 encodes or maps the data bits into tones using, for example, a quadrature amplitude modulation (QAM) protocol by representing each grouping of bits with a discrete tone. In accordance with an exemplary implementation of the present invention, each tone may be modulated to carry up to 15 bits or more of data. Encoder 310 maps the designated number of bits to each respective tone and represents each tone with a complex number that indicates phase and amplitude information for that particular tone in the frequency domain.

IFFT logic 320 receives the complex numbers representing the tones from encoder 310. IFFT logic 320 converts the frequency domain information into time domain information. IFFT logic 320 may also add a cyclic prefix or guard band to the time domain information to eliminate the effects of ISI.

Parallel-to-serial converter 330 may convert the parallel time domain information from IFFT logic 320 into a serial signal stream. D/A converter 340 may convert the serial signal stream of data to an analog format and pass the analog data to AFE 350. AFE 350 receives the analog waveforms and transmits the analog waveforms on channel 130.

Figure 4:
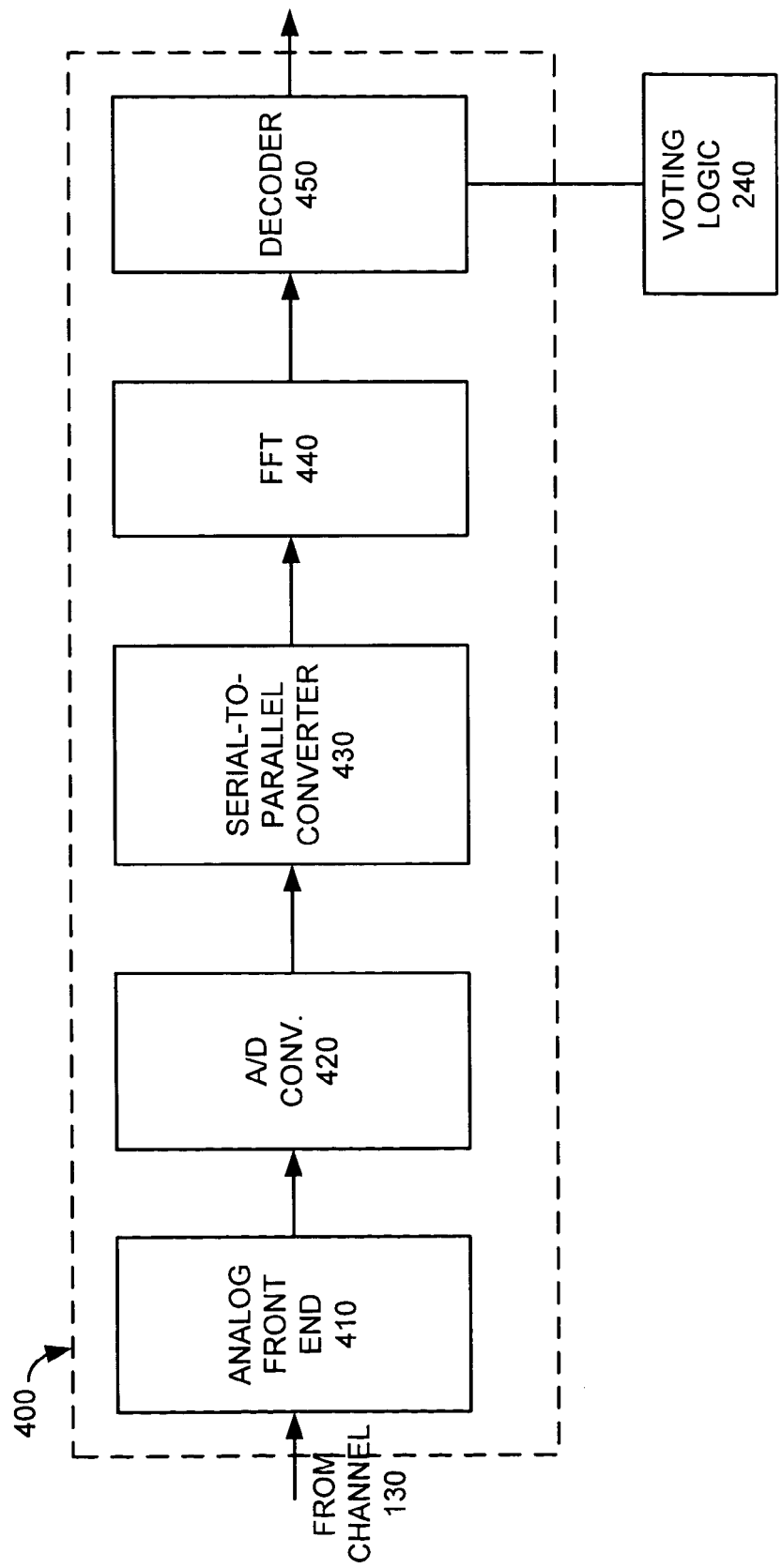
FIG. 4 is an exemplary detailed block diagram of a receiver portion of the transceiver of FIG. 2, consistent with an implementation of the present invention.

FIG. 4 is an exemplary detailed diagram of the receiver portion 400 of transceiver 220 (referred to as receiver 400) according to an implementation consistent with the present invention. Receiver 400 may include AFE 410, analog-to-digital (A/D) converter 420, serial-to-parallel converter 430, FFT logic 440 and decoder 450. Receiver 400 essentially performs the reverse operation as transmitter 300.

AFE 410 receives analog waveforms transmitted on channel 130 and forwards these waveforms to A/D converter 420. A/D converter 420 converts the analog waveforms into a digital format. Serial-to-parallel converter 430 converts the serial waveform into a parallel format. Serial-to-parallel converter 430 may also remove the cyclic prefix from the signal. FFT logic 440 transforms the parallel data from the time domain signal back into a frequency domain representation containing amplitude and phase information for each tone. Decoder 450 decodes the frequency domain representation back into the original serial bit stream which may be forwarded, for example, to voting logic 240.

As discussed above, transmitter 300 of a station may transmit each predetermined number of bits on each of several different tones in a redundant manner to increase reliability. According to an exemplary implementation of the present invention, transmitter 300 of a station, such as station 110, transmits each predetermined number of bits on each of N consecutive tones, where N represents any odd integer. Receiver 400 of another station, such as station 120, may then decode the N tones and forward the decoded data to voting logic 240. Voting logic 240 may then determine the identity of the intended data transmitted by the transmitter using a voting scheme, as described in more detail below.

Loading logic 230 and voting logic 240 are illustrated in FIG. 2 as being separate components from transceiver 220. It should be understood that in some implementations consistent with the present invention, loading logic 230 and voting logic 240 may be part of transceiver 220. It should also be understood that loading logic 230 and voting logic 240 may be implemented in hardware, software or any combination of hardware and software. Thus, the present invention is not limited to any specific combination of hardware circuitry and software.

As discussed above, loading logic 230 works in conjunction with transceiver 220 to transmit a number of bits on each of a predetermined number of tones. Voting logic 240 may then identify the data transmitted on the number of tones, as described in detail below.

Figure 5:
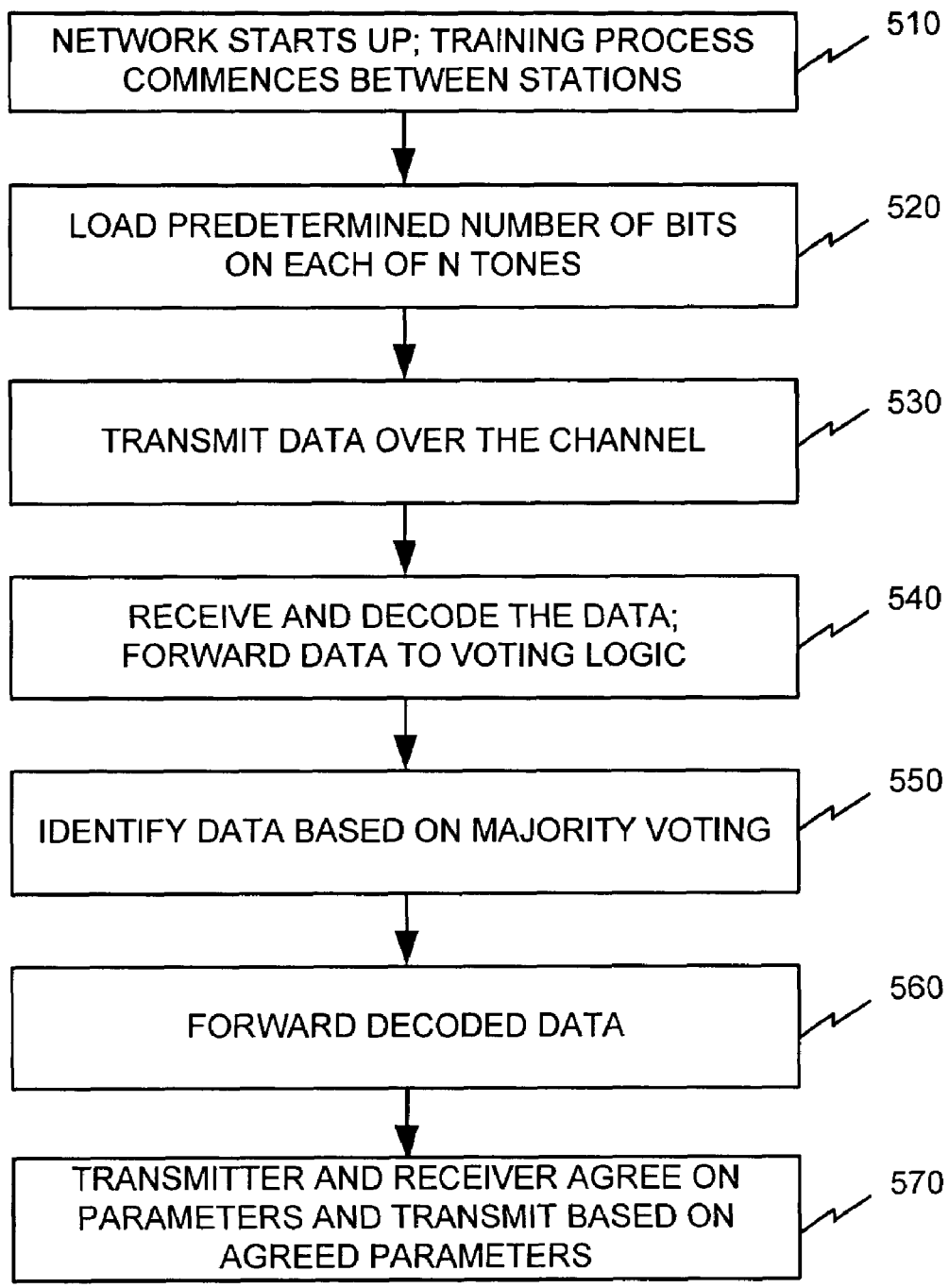
FIG. 5 is a flow diagram illustrating exemplary processing associated with transmitting and receiving data, consistent with an implementation of the present invention.

FIG. 5 illustrates exemplary processing associated with transmitting and receiving data in network 100 according to an implementation consistent with the present invention. Processing may begin upon start up of network 100 (act 510). During the start-up phase, a training process may commence (act 510). The training process may include a handshaking procedure between stations 110 and 120. The handshaking may indicate that the stations will communicate via DMT modulation and indicate the particular tones that will be used.

According to an exemplary implementation of the present invention, during the training process, loading logic 230 may signal encoder 310 to load a predetermined number of bits of the same data on each of N different tones, where N represents any an odd integer (act 520). In other words, each bit will be transmitted in a redundant fashion over N separate tones. The N tones may, for example, be non-consecutive tones (i.e., not adjacent in the frequency domain). Non-consecutive tones may be used to transmit the redundant data to further reduce the likelihood of errors. For example, if a tone at a certain frequency is subjected to noise or other problems, the neighboring tones in a similar frequency range may also be expected to experience a significant amount of noise. Separating the redundant data over a wider frequency range makes it less likely that the tones used to carry the redundant data will have the same problems.

As an example, assume that the predetermined number of bits is one and N is seven. In this case, loading logic 230 signals encoder 310 to load each single bit of data on each of seven non-consecutive tones. The seven non-consecutive tones may be separated over the total number of carrier tones. For example, if 256 tones are used in the DMT system, each tone may be separated by about 256/7 tones or about 36 tones. In this case, tones 1, 37, 73, 109, 145, 181 and 217 may be used to transmit the same bit of data. Tones 2, 38, 74, etc. may then be used to transmit the next bit(s) of data and so on. In this manner, the entire frequency domain is utilized and the maximum carrier frequency separation between redundant bit(s) of data may be achieved. In alternative implementations, the redundant data may be transmitted on tones spaced apart by other numbers of tones (i.e., not the maximum separation) or on consecutive tones.

In addition, loading logic 230 may signal encoder 310 to transmit data bits representing "1" at maximum or near maximum power and data bits representing "0" at zero or near zero power. Encoder 310 may also transmit a "1" at a particular magnitude and phase and a "0" at another magnitude and phase. Other schemes may also be used to indicate a "1" versus a "0."

Encoder 310 then encodes the handshaking/training data according to the information received from loading logic 230. The encoded data is then processed by transmitter 300 as discussed above with respect to FIG. 3 and transmitted to station 120 via channel 130 (act 530).

Station 120 receives the data transmitted via channel 130 (act 540). Receiver 400 may then decode the data as discussed above with respect to FIG. 4 (act 540). Receiver 400 may be preconfigured to recognize that data bits corresponding to a "1" will be transmitted at maximum power and data bits corresponding to "0" will be transmitted at zero power. Decoder 450 forwards the decoded data to voting logic 240 (act 540).

Voting logic 240 may then take a majority vote to identify each data bit (act 550). For example, voting logic 240 may be preconfigured to recognize that each predetermined number of bits transmitted from station 110 during training are to be transmitted on N separate tones in a redundant manner. For example, using the scenario described above in which each single bit is being transmitted on each of the seven different tones, voting logic 240 determines that the bit transmitted from station 110 is a "1" if more than one half of the seven tones are "1." If, on the other hand, more than one half of the seven tones are "0," voting logic 240 determines that the bit transmitted from station 110 is a "0." Voting logic 240 determines the value of each bit in a similar manner. That is, voting logic 240 examines every N tones and determines the identity of each bit based on a majority voting. The likelihood of getting an error on more than 50% of the tones is minimal and therefore the reliability associated with the received data is increased.

The example described above assumes that each single bit is transmitted on N non-consecutive tones. In other implementations, the number of bits transmitted on each of the N tones may be more than 1. For example, suppose that two bits are transmitted on each tone. In this case, voting logic 240 may determine the identity of every two bits based on a majority voting. For example, if voting logic 240 receives a pattern of 00, 01, 01, 01, 10, 01 and 00 on seven tones from decoder 450, voting logic 240 may vote on each individual bit. For example, voting logic 240 may vote on the first bit of the two bits. In this case, since six of the seven first bits are "0," voting logic 240 determines that the first bit transmitted from station 110 is "0." Voting logic 240 may then vote on the second of the two bits. In the example above, since four of the seven second bits are "1," voting logic 240 determines that the second bit is "1." Therefore, in this case, voting logic identifies the transmitted data as "01."

In an alternative implementation, voting logic may vote on the bits as a group. In this case, voting logic determines that the bits transmitted from station 110 are "01," since four of the seven decoded bit patterns are "01."

Voting logic 240 may also implement voting schemes other than majority voting. For example, if voting on the bits as a group is used and none of the decoded bit patterns constitutes a majority of the decoded bit patterns, voting logic 240 may determine the identity of the bit pattern by identifying the most frequent pattern received on the N tones. In addition, other error detection schemes using error correction codes may also be used.

In either case, voting logic 240 forwards the identified data associated with each group of N tones back to transceiver 220 (act 560). In this manner, transceiver 220 is able to determine the identity of the data that was actually sent from station 110. Handshaking and other training processes may proceed in this manner between stations 110 and 120. That is, station 120 may similarly transmit data in a redundant manner over the predetermined number of consecutive tones. It should be understood that both stations 110 and 120 are preconfigured to recognize the particular number of redundant bits to be transmitted on each of the predetermined number of tones.

After the handshaking and other training processes are complete, stations 110 and 120 have agreed on the parameters associated with transmitting data between themselves and may begin transmitting and receiving data based on the agreed parameters (act 570). For example, stations 110 and 120 will each know the selected bit loading information for each tone. Stations 110 and 120 may also commence transmitting data in a faster, conventional manner, e.g., sending several data bits on each tone and not repeating the bits on each of N separate tones. In other words, stations 110 and 120 may transmit data in accordance with the channel quality determined during the training. In this case, loading logic 230 sets the number of data bits per tone based on the newly agreed parameters established during training.

Alternatively, if the channel quality of channel 130 is extremely poor, i.e., low signal-to-noise ratio (SNR) for each of the tones, stations 110 and 120 may continue to transmit data on each of the tones in a redundant manner, as described above, albeit at the expense of data throughput.

CONCLUSION

Systems and methods consistent with the principles of the present invention transmit and receive data in a DMT transmission system in a reliable manner. An advantage of the present invention is that the effect of noise on a channel and unknown channel frequency response may be effectively minimized by transmitting data in a redundant manner over a number of different tones. As a result, the reliability of the data may be significantly improved.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, while the present invention has been described with respect to two stations transmitting data between themselves, the present invention may also be implemented in other network devices. Lastly, while a series of acts has been described with respect to FIG. 5, the order of the acts may be varied in other implementations consistent with the present invention. Moreover, non-dependent acts may be implemented in parallel. No element, act, or instruction used in the description of the present invention should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In a discrete multitone (DMT) system, a method for transmitting data between a first device and a second device, the method comprising:

loading, by the first device, a predetermined number of bits of data for each of a plurality of N non-consecutive tones, where N is an odd integer;

transmitting, by a transmitter portion of the first device, redundant sets of data on each of the plurality of N non-consecutive tones, each of the redundant sets of data including the predetermined number of bits of data, where each of the N non-consecutive tones is not adjacent in a frequency domain to other ones of the N non-consecutive tones;

receiving, by the second device, the redundant sets of data by the second device; and identifying the data represented by the redundant sets of data using a voting scheme.

2. The method of claim 1, where the predetermined number of bits of data comprises one bit.

3. The method of claim 1, where the identifying the data comprises:

decoding the N non-consecutive tones; and determining the identity of a data bit represented by a redundant set of data when more than one half of the decoded N non-consecutive tones correspond to a particular value.

4. The method of claim 1, where the transmitting comprises:

transmitting a data bit representing a "1" with a maximum or near-maximum power level.

5. The method of claim 4, where the transmitting further comprises:

transmitting a data bit representing a "0" with a zero or near-zero power level.

6. The method of claim 1, where the transmitting redundant sets of data is performed during a training period.

7. The method of claim 1, where the predetermined number of bits comprises a plurality of bits and where the identifying comprises:

decoding the N non-consecutive tones to identify the plurality of bits, and voting on the identity of each of the plurality of bits on a bit-by-bit basis.

8. A first device to communicate using discrete multitone (DMT) modulation, comprising:

logic to receive, from a second device, a first number of bits of data, transmitted on each tone of a first plurality of tones;

logic to identify the first number of bits of data based on a voting scheme; and logic to transmit the identified first number of bits associated with each tone of the plurality of tones, from the first device to the second device, during at least a training period associated with the first device and the second device.

9. The first device of claim 8, where the first plurality of tones comprise:

N tones, where N is an odd integer, and the first number of bits of data comprises one bit.

10. The first device of claim 9, further comprising:

logic to decode the first number of bits of data transmitted on each of the N tones, and forward the decoded first number of bits of data; and where the logic to identify the first number of bits of data comprises:

a voter to receive the decoded first number of bits of data, and determine that a bit is equal to a first value when more than one half of the decoded N tones correspond to the first value.

11. The first device of claim 8, where the logic to receive a first number of bits of data is to receive data transmitted, from the second device, at a first power level for data representing a "1" and transmitted at a second power level for data representing a "0."

12. The first device of claim 8, where the logic to receive a first number of bits of data is to receive data, from the second device, representing a "1," using a first magnitude and phase, and receive data representing a "0," using a second magnitude and phase, where the second magnitude and phase are different than the first magnitude and phase.

13. The first device of claim 8, where the logic to transmit the redundant set of data transmits the first number of bits of data on each tone of the plurality of different tones, during the training period.

14. The first device of claim 8, where the logic to identify the first number of bits of data is to:

decode the received first number of bits of data, and identify the first number of bits of data on a bit-by-bit voting.

15. A first device to communicate in a discrete multitone (DMT) system, comprising:

a transmitter to transmit redundant data, including a predetermined number of bits, on each of a first number of tones, where the first number of tones are equally separated over a maximum number of tones used in the DMT system, to a second device; and a receiver to:

receive data transmitted on the first number of tones from the second device, decode the data received on the first number of tones, and determine the identity of the received data based on a determination that a bit or group of bits is equal to a first value when more than one half of the decoded first number of tones correspond to the first value.

* * * * *